United States Patent
Gil

(10) Patent No.: US 10,289,290 B2
(45) Date of Patent: May 14, 2019

(54) APPARATUS AND METHOD FOR DISPLAYING A PORTION OF A PLURALITY OF BACKGROUND APPLICATIONS

(71) Applicant: Samsung Electronics Co., Ltd., Suwon-si, Gyeonggi-do (KR)

(72) Inventor: Hyunseok Gil, Overland Park, KS (US)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 14/730,750

(22) Filed: Jun. 4, 2015

(65) Prior Publication Data

US 2016/0357409 A1  Dec. 8, 2016

(51) Int. Cl.
| | |
|---|---|
| *G06F 3/048* | (2013.01) |
| *G06F 3/0484* | (2013.01) |
| *G06F 3/0488* | (2013.01) |
| *G06F 3/0481* | (2013.01) |
| *G06F 3/0482* | (2013.01) |

(52) U.S. Cl.
CPC ........ *G06F 3/04845* (2013.01); *G06F 3/0481* (2013.01); *G06F 3/0482* (2013.01); *G06F 3/0488* (2013.01); *G06F 3/04842* (2013.01)

(58) Field of Classification Search
CPC .............. G06F 3/0481; G06F 3/04817; G06F 3/04842; G06F 3/04847; G06F 3/0488; G06F 3/04883
See application file for complete search history.

(56) References Cited

U.S. PATENT DOCUMENTS

| | | | |
|---|---|---|---|
| 4,868,765 A | 9/1989 | Diefendorff | |
| 5,425,141 A | 6/1995 | Gedye | |
| 7,075,512 B1 * | 7/2006 | Fabre | G06F 3/0481 345/156 |
| 2008/0163082 A1 | 7/2008 | Rytivaara | |
| 2011/0029907 A1 * | 2/2011 | Bakhash | G06F 3/04815 715/769 |
| 2011/0113363 A1 * | 5/2011 | Hunt | G06F 3/0481 715/800 |
| 2011/0216095 A1 * | 9/2011 | Rydenhag | G06F 3/0482 345/676 |
| 2013/0152010 A1 | 6/2013 | Weber et al. | |
| 2013/0162667 A1 * | 6/2013 | Eskolin | G06F 3/0488 345/619 |
| 2014/0007019 A1 | 1/2014 | Saukko et al. | |
| 2014/0201660 A1 | 7/2014 | Clausen et al. | |

(Continued)

OTHER PUBLICATIONS

European Patent Office Communication regarding Application No. 16160696.7, dated Dec. 20, 2018, 7 pages.

*Primary Examiner* — Claudia Dragoescu

(57) ABSTRACT

An apparatus and method for displaying a portion of plurality of background applications are provided, wherein an open application is in the foreground and one or more other open applications are in the background. The method includes receiving a user input to display an application currently in the background, in response to the user input, removing a portion of the application in the foreground, at a location on the display screen where the portion of the foreground application is removed, displaying at least a portion of an application currently in the background, and maintaining, at remaining locations, display of the application in the foreground.

35 Claims, 8 Drawing Sheets

(56) References Cited

U.S. PATENT DOCUMENTS

2014/0351729 A1* 11/2014 Park .................. G06F 9/4443
                                              715/767
2014/0359504 A1* 12/2014 Kim .................. G06F 3/0488
                                              715/768

* cited by examiner

APPARATUS AND METHOD FOR DISPLAYING A PORTION OF A PLURALITY OF BACKGROUND APPLICATIONS

TECHNICAL FIELD

The present disclosure relates to an apparatus and method for displaying a portion of a plurality of background applications.

More particularly, the present disclosure relates to an apparatus and method for a problem when the user would see only a portion of another application page without switching or a multi window feature offered only for certain applications.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

On a desktop/laptop or comparable computer that offers a larger screen than a mobile device, switching between applications or displaying multiple windows is not difficult. However, on a small screen device such as a mobile terminal, displayed information is generally limited to only a single application at a time. When a user needs to refer to a different application, the user much change applications. Another solution is "Multi Window" but this is limited to particular apps; further, Multi Window in a mobile terminal occupies at least third of an entire screen, even if the user would see only a small portion of another page.

Rytivaara (US Pat. App. Pub. 2008/0163082, "Transparent layer application") describes displaying two applications simultaneously, where the second application is transparently presented over the first application. Also, the first application is operated through a keypad and the second application is operated through touch screen.

Some distinctions from Rytivaara's invention are that the present disclosure provides capabilities that a user can see a background application through the foreground application, the portion of view can be moved around, and the user can choose at which level of background an application will be displayed so that the portion of view is not interfering with the user seeing a foreground application. The main disadvantage of Rytivaara's invention is that different input operations will tend to make the user confused, and the view of the top application will interfere with the user seeing a second application.

Diefendorff (U.S. Pat. No. 4,868,765, "Porthole window system for computer displays") describes that a porthole window system for computer displays allows a user to look at a portion of a window which could otherwise not be seen. A porthole window acts as an opening in a window of the usual type through which underlying windows may be seen. A porthole window can have different features as desired, including links to selected source and target windows, real time movement on the display screen, and the ability to be updated when a target window is updated. The porthole system runs concurrently with the normal window handling system of the computer. The porthole system is related art in terms of seeing an underneath application through a porthole on top of the foreground application. However, the porthole system does not include a control to change the level of the underneath application that will be seen through porthole. Further, the view size is fixed, and cannot swap the view level by selecting a currently visible underneath application.

Gedye (U.S. Pat. No. 5,425,141, "Managing display windows of inter-related applications using hollowed windows") describes that at least one background display window is generated and displayed behind a hollowable portion of the foreground display window, rendering the visibility and accessibility of the at least one background display window to be dependent on the foreground display window. Gedye's invention is similar to a pop-up window related to the foreground application. Gedye's invention has the ability to show only inter-related applications, such as right click on a mouse or menu pop-up.

Weber, et al. (US Pat. App. Pub. 2013/0152010, "Multiple tab stack user interface") describes displaying multiple web pages in a stack like tab Graphical User Interface (GUI) to switch tab in Chrome. Weber's invention is related in that that multiple tabs are stacked, but does not feature switching tabs and manipulating the level of the tabs.

Clausen, et al. (US Pat App. Pub. 2014/0201660, "Apparatus and method for application peel") describes peeling an application view to manage a plurality of applications concurrently running. Only a predefined portion of a foreground application can be peeled, and only a predefined area of a background application can be present.

Accordingly, there is a need for an apparatus and method for providing an improved user interface displaying a plurality of background applications in a mobile terminal.

SUMMARY

Aspects of the present disclosure are to address at least the above-mentioned problems and/or disadvantages and to provide at least the advantages described below. Accordingly, an aspect of the present disclosure is to provide an apparatus and method to display small portion of applications behind a foreground application. For example, if a user would make note from a web page, but the web page blocks copy/paste actions by script on any kinds of note application, the user is required to switch applications over again. The present disclosure provides displaying of only a portion of the browser application on/under the note application, and thus will provide the user a better User Experience (UX)/User Interface (UI). Further, the present disclose also improves battery life of the mobile terminal.

In accordance with an aspect of the present disclosure, a method for a mobile device comprising a plurality of applications open concurrently, wherein an open application is in the foreground and one or more other open applications are in the background, is provided. The method includes receiving a user input to display an application currently in the background, in response to the user input, removing a portion of the application in the foreground, at a location on the display screen where the portion of the foreground application is removed, displaying at least a portion of an application currently in the background, and maintaining, at remaining locations, display of the application in the foreground.

In accordance with another aspect of the present disclosure, an apparatus for a mobile device comprising a plurality of applications open concurrently, wherein an open application is in the foreground and one or more other open applications are in the background, is provided. The apparatus includes a display screen and a controller. The controller is configured to receive a user input to display an application currently in the background, to remove a portion of the application in the foreground in response to the user input, to display at least a portion of an application currently in the background at a location on the display screen where the portion of the foreground application is removed, and to maintain, at remaining locations, display of the application in the foreground.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
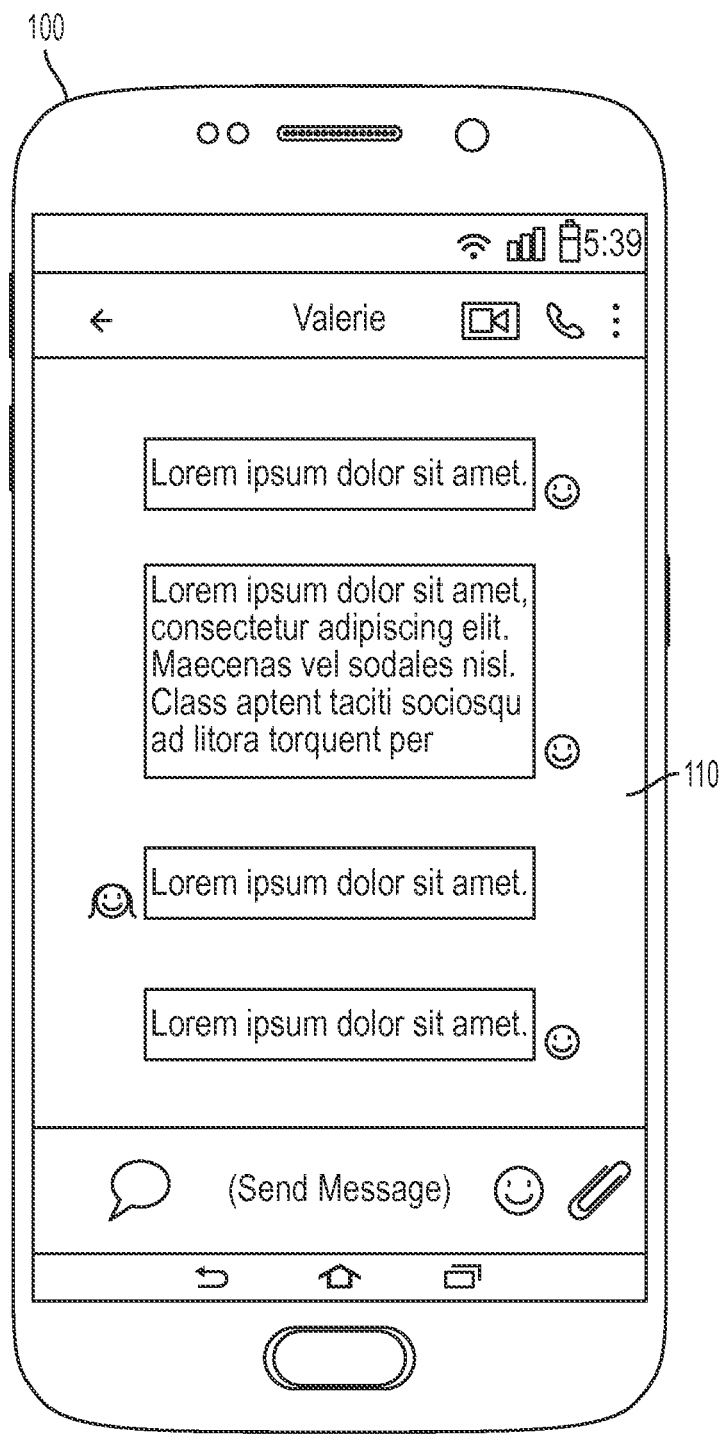
FIG. 1 illustrates a portable device on which multiple applications are running, according to an embodiment of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for displaying a portion of plurality of background applications.

FIG. 1 illustrates a portable device on which multiple applications are running, according to an embodiment of the present disclosure.

Referring to FIG. 1, a mobile device 100 is shown with a plurality of applications are open concurrently, for example, a browser, a contact, a view, and a messenger application 110. On the mobile device there is normally a limit of one application that can be open in the foreground at any time, and other open applications are in the background. In the example of FIG. 1, the messenger application 110 is in the foreground and all other open applications are in the background and thus not displayed on the screen.

Figure 2:
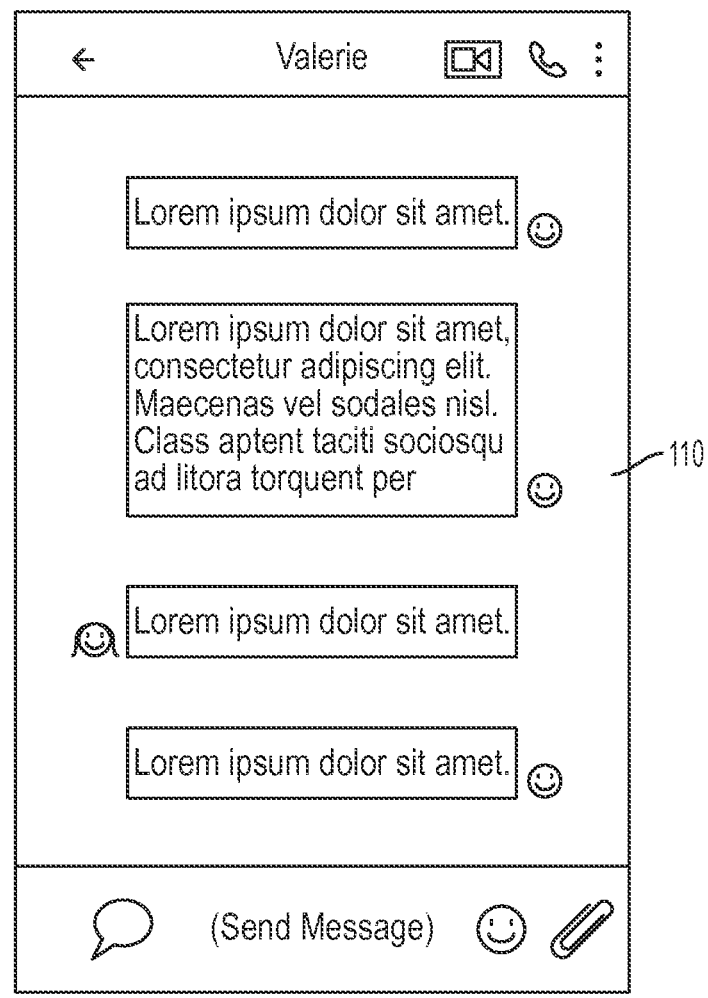
FIG. 2 illustrates a screen of a mobile device according to an embodiment of the present disclosure.

FIG. 2 illustrates a screen of a mobile device according to an embodiment of the present disclosure.

Referring now to FIG. 2, only the single application, e.g., a messenger application 110, is normally displayed in the foreground of the mobile device. For this example assume that there are multiple open applications in the background concurrently with the messenger application 110 being open in the foreground.

Figure 3:
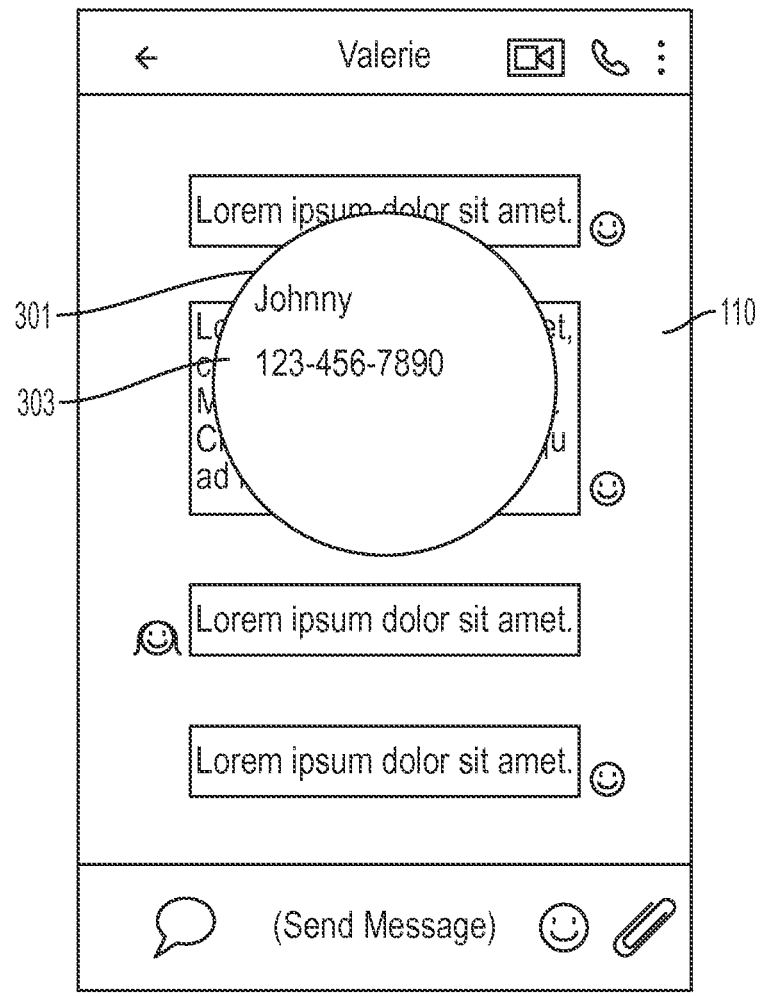
FIG. 3 illustrates a screen of a mobile device according to an embodiment of the present disclosure.

FIG. 3 illustrates a screen of a mobile device according to an embodiment of the present disclosure.

Referring now to FIG. 3, in response to a user input, a portion 301 of the foreground application, e.g., the messenger application 110, is removed at a location on the screen, and at least a portion of a background application, e.g., a Contact application 303, is displayed at the location.

The user input may be a gesture or other input determined by the manufacturer. Alternatively, the user input may be configured by the user.

The location where the portion of the foreground application, e.g., the messenger application 110, is removed may be predetermined. Alternatively, the location where the portion of the foreground application is removed may be determined according to the user input. For example, an "unpinching" touch input may open a "hole" in the foreground application.

A size and shape of the removed portion 301 of the foreground application may be predetermined. Alternatively, the size or shape of the removed portion 301 of the foreground application may be determined according to the user input.

A size, shape, and location of the removed portion 301 of the foreground application may be changed dynamically.

Figure 4:
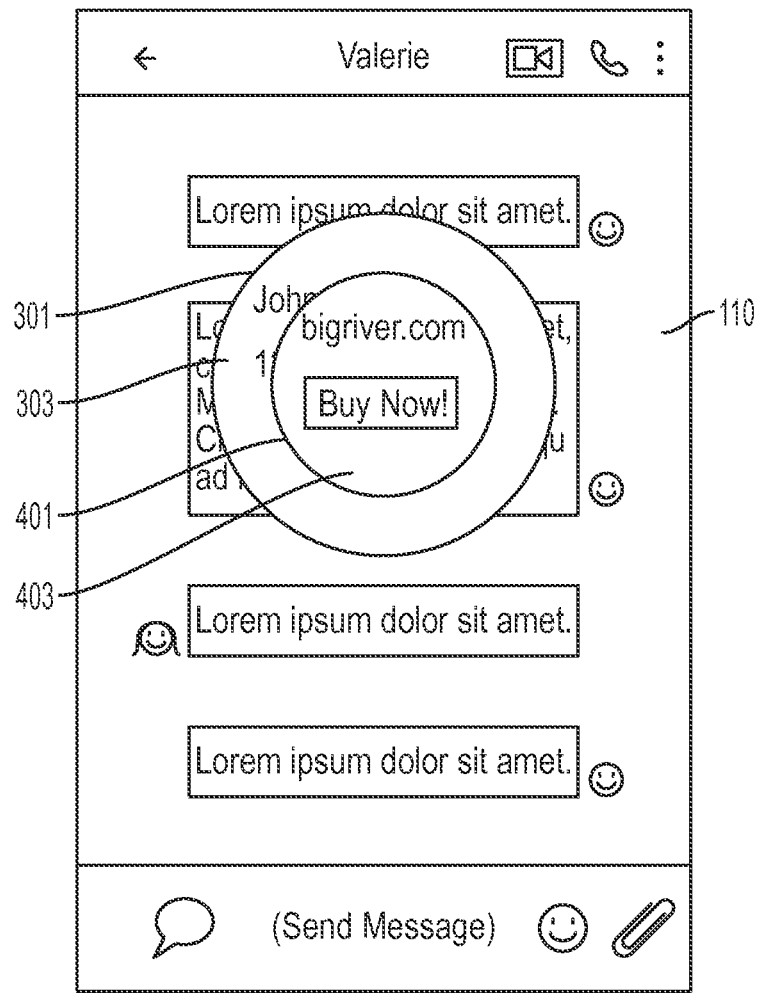
FIG. 4 illustrates a screen of a mobile device according to an embodiment of the present disclosure.

FIG. 4 illustrates a screen of a mobile device according to an embodiment of the present disclosure.

Referring now to FIG. 4, the user has repeated the gesture to display a background application. In this example, a portion 401 of the first background application, e.g., the Contact application 303, is removed, and a second background application, e.g., a Browser application 403, is displayed. A perimeter portion of the first background application 303 may be displayed such that the user may see how deep into the stack of background applications he is currently viewing.

A size, shape, and location of the removed portions 301 and 401 of the applications may be changed dynamically. For example, as more background applications are viewed, size of the removed portions may be increased to allow for a clear view of the deepest viewed background application.

Similarly, if the increased size would move a removed portion off-screen, the location may be adjusted to maintain optimal visibility, or the shape of the removed portions may be adjusted to the constraints of the display. Further, if there is active information on the foreground application, for example, a new message is received in the messenger application 110, the location, size, or shape of the removed portion may be dynamically adjusted to minimize interference with viewing the active information.

Figure 5:
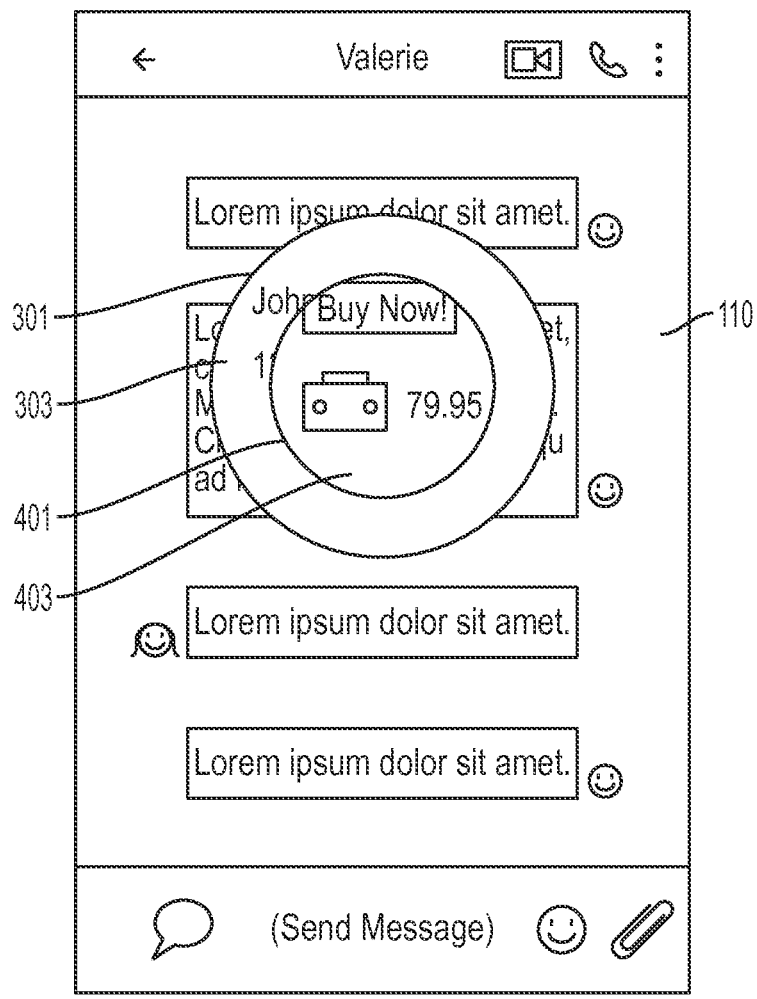
FIG. 5 illustrates a screen of a mobile device according to an embodiment of the present disclosure.

FIG. 5 illustrates a screen of a mobile device according to an embodiment of the present disclosure.

Referring now to FIG. 5, the user may manipulate a displayed background application. For example, if the background application was scrollable when it was in the foreground, the user may scroll the displayed portion of the background application visible at the location. FIG. 5 illustrates the example where the background Browser application 403 of FIG. 4 is the deepest background application currently displayed in the removed portion 401 of background Contact application 303, and the background Browser application 403 is normally scrollable. In FIG. 5 a user has scrolled the Browser application 403 upward to view a lower part of the Browser application 403 in the same removed portion 401.

When the background application, e.g., the Browser application 403, is manipulated, it is the displayed portion only that changes. The viewing of the background application does not bring the background application to the foreground or enable executable inputs to the background application that are not otherwise available.

The displayed background application will normally be a background application which was most recently in the foreground. That is, a stack of background applications will be maintained, such that each time an application is moved from the foreground to the background, that application is put on top of the stack.

Figure 6:
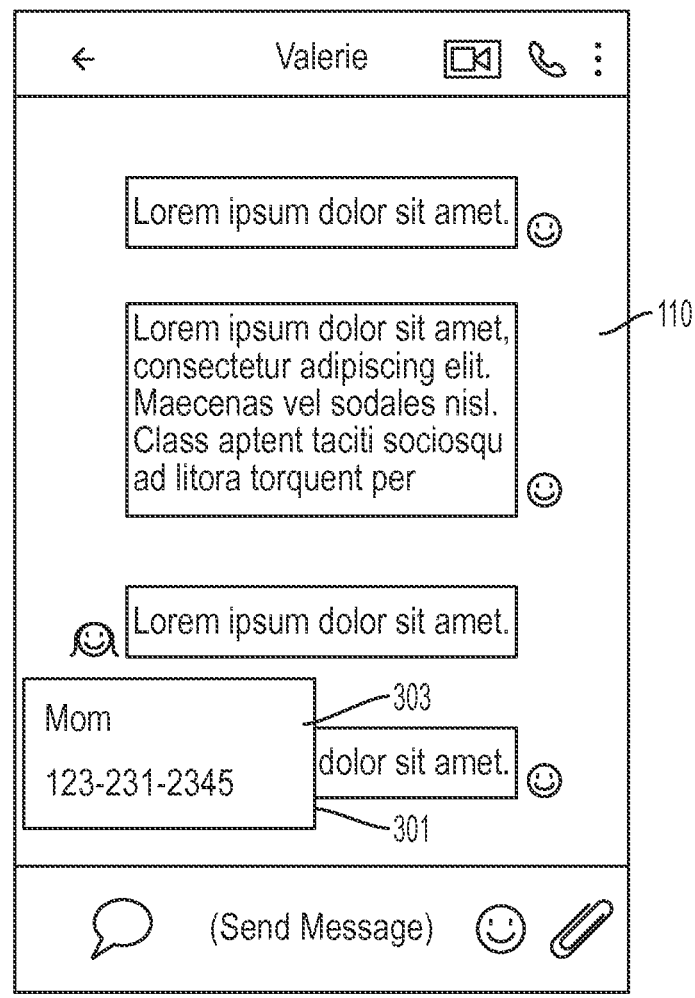
FIG. 6 illustrates a screen of a mobile device according to an embodiment of the present disclosure.

FIG. 6 illustrates a screen of a mobile device according to an embodiment of the present disclosure.

Referring now to FIG. 6, a case is shown wherein only the single background application 303 is being displayed in the removed portion 301. For example, the user can close the display of the second background application 403 of FIG. 4. In this example the user has elected to move the removed portion 301 to a different location on the screen, and to change the shape of the removed portion 301 to more clearly access the information he wishes to view. The displayed portion of the background application 303 would be a portion of the background application 303 corresponding to the new location and shape of the removed portion 301. In this manner a user may drag the removed portion 301 to view different parts of the background application 303. For example, the desired content of the background application 303 may not be located at the location where the user first removed the removed portion 301.

Alternatively, the displayed portion of the background application 303 can be fixed for display by a user selection, such that the displayed portion of the background application 303 is maintained even when the location of the removed portion 301 is changed. For example, the initial location of the removed portion 301 may be the correct location for the desired content, but may at a location where the user needs to see the content of the foreground application 110. For example, after displaying the desired content of the background application 303, the user may fix the displayed content and drag the removed portion 301 to a different location and/or shape while maintaining the display of the same content of background application 303.

If there is no input for a predetermined time, the removed portion 301 of the foreground application 110 is restored. Alternatively, the removed portion 301 of the foreground application 110 may be restored in response to a second user input.

Figure 8:
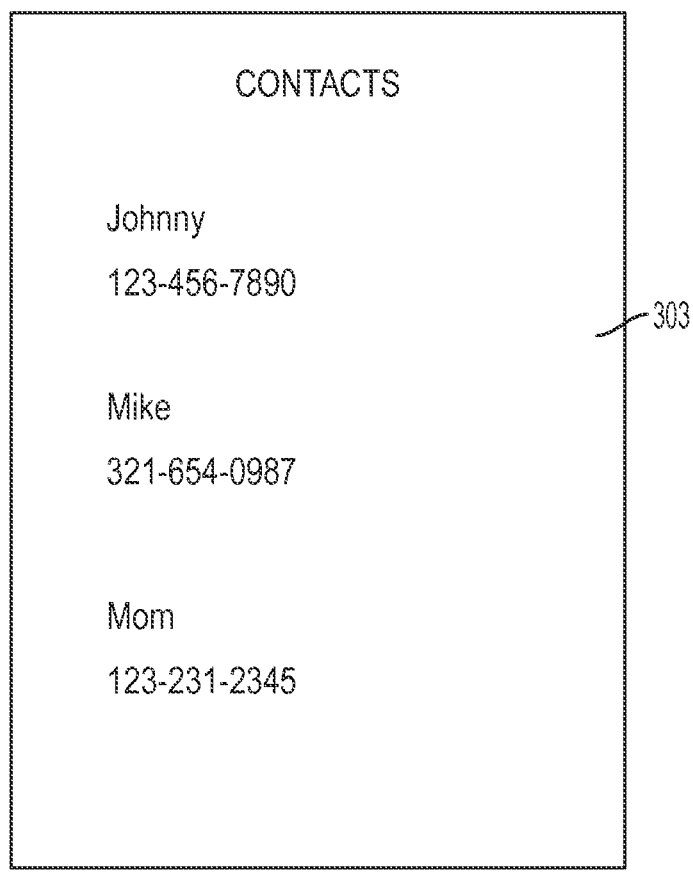
FIG. 8 illustrates a screen of a mobile device according to an embodiment of the present disclosure.

FIG. 8 illustrates a screen of a mobile device according to an embodiment of the present disclosure.

Referring now to FIG. 8, the user may select to raise the displayed background application, for example, the Contact application 303, to the foreground, and move the original foreground application, for example, the Messenger application 110, to the background application's location in the stack or to the top of the stack. The original foreground application, e.g., the Messenger application 110, will not normally be visible or displayed when it is moved to the background.

The user input may be received multiple times to display multiple levels of background applications. For example, the user may remove a portion of the foreground application to reveal and display a first background application, and may then remove a portion of the first background application to reveal and display a second background application, as depicted in FIG. 4 and FIG. 5.

If multiple background applications are displayed, at least a border portion of each displayed background application may be displayed. In this manner the user is assisted to know how "deep" into the stack of background applications he is viewing. The removed portion of each application will be smaller than the removed portion of the application above it.

With the present disclosure, the user may thus view various background applications while maintaining an open foreground application. The user may manipulate the removed portion of the foreground application. The user may manipulate the displayed portion of the background application. The user may switch the foreground and displayed background applications with each other. The user may recursively remove a portion of each application to view the contents of the stack sequentially; alternatively, the user may view a display of images of all background applications and select a displayed image to display the corresponding background application at the location.

With the present disclosure, the user may thus quickly and easily view information and content in one or more background applications while maintaining an open running foreground application.

Figure 7:
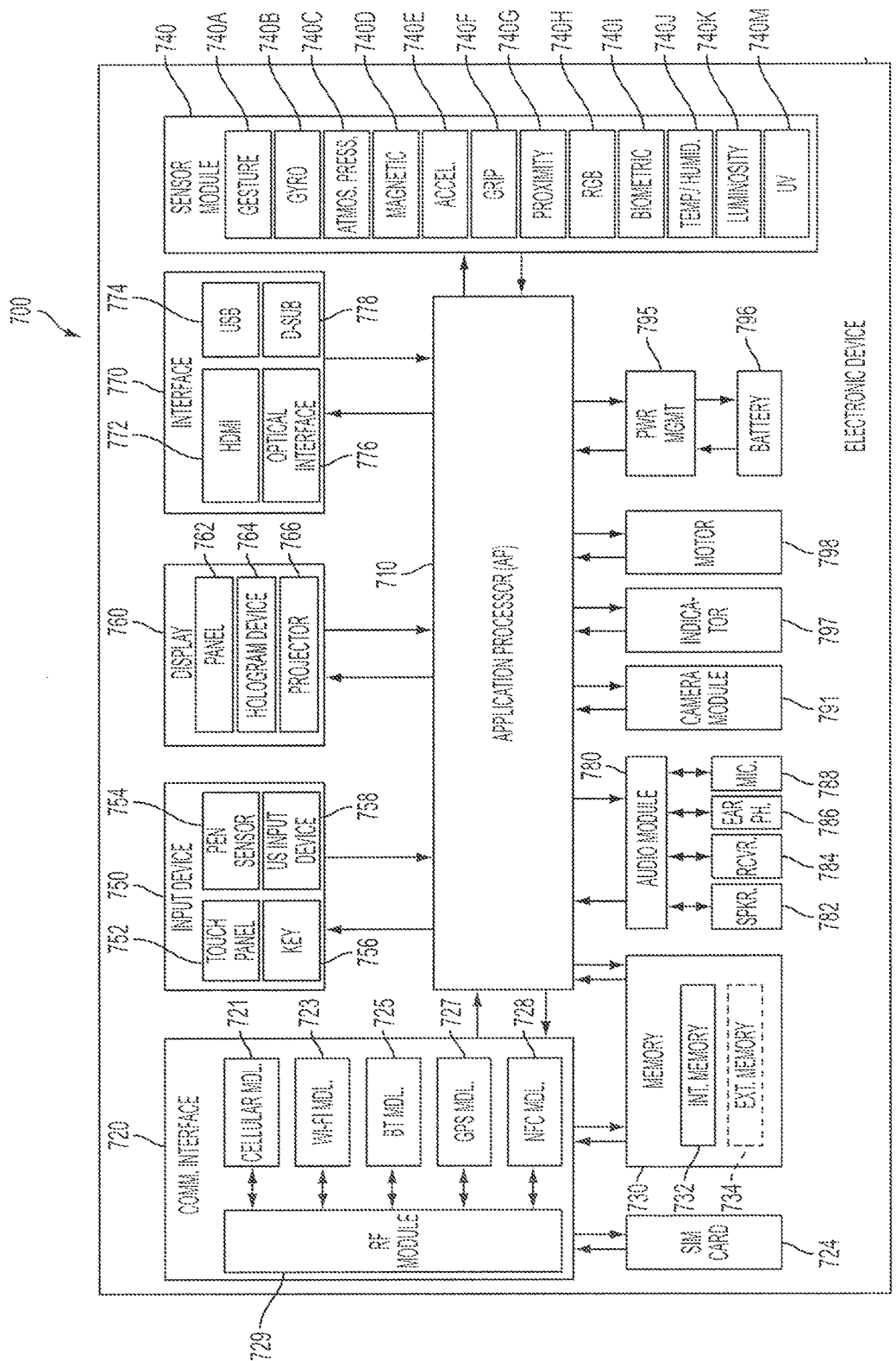
FIG. 7 illustrates a block diagram of hardware according to various embodiments of the present disclosure.

FIG. 7 illustrates a block diagram of hardware according to various embodiments of the present disclosure.

Referring to FIG. 7, hardware 701 may be, for example, a part or all of the electronic device 101. The hardware 701 may include one or more Application Processors (AP) 710, a communication module 720, a Subscriber Identification Module (SIM) card 724, a memory 730, a sensor module 740, an input module 750, a display module 760, an interface 770, an audio module 780, a camera module 791, a power management module 795, a battery 796, an indicator 797, a motor 798, and/or the like.

The AP 710 may control one or more hardware or software components that are connected to AP 710, perform processing or computation of data (including multimedia data), and/or the like. As an example, the AP 710 may be implemented as a System-on-Chip (SoC). The AP 710 may include a Graphics Processing Unit (GPU) (not shown).

The communication module 720 (e.g., the communication interface 160) may transmit and receive data in communications between the electronic device 101 and other electronic devices (e.g., the electronic device 104, the server 106, and/or the like). As an example, the communication module 720 may include one or more of a cellular module 721, a Wi-Fi module 723, a Bluetooth module 725, a GPS module 727, a NFC module 728, a Radio Frequency (RF) module 729, and/or the like.

The cellular module 721 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). As an example, the cellular module 721 may differentiate and authorize electronic devices within a communication network using a Subscriber Identification Module (SIM) card (e.g., the SIM card 724). According to various embodiments of the present disclosure, the cellular module 721 may perform at least a part of the functionalities of the AP 710. For example, the cellular module 721 may perform at least a part of multimedia control functionality.

According to various embodiments of the present disclosure, the communication interface 720 and/or the cellular module 721 may include a Communication Processor (CP). As an example, the cellular module 721 may be implemented as SoC.

Although FIG. 7 illustrates components such as the cellular module 721 (e.g., CP), the memory 730, the power management module 795 as components that are separate from the AP 710, according to various embodiments of the present disclosure, the AP 710 may include, or be integrated with, one or more of the foregoing components (e.g., the cellular module 721).

According to various embodiments of the present disclosure, the AP 710, the cellular module 721 (e.g., CP), and/or the like, may process instructions or data received from at least one of non-volatile memory or other components by loading in volatile memory. The AP 710, the cellular module 721, the communication interface 720, and/or the like, may store at non-volatile memory at least one of data that is received from at least one of other components or data that is generated by at least one of the other components.

Each of the Wi-Fi module 723, the Bluetooth module 725, the GPS module 727, the NFC module 728, and/or the like may, for example, include one or more processors that may process data received or transmitted by the respective modules. Although FIG. 7 illustrates the cellular module 721, the Wi-Fi module 723, the Bluetooth module 725, the GPS module 727, and the NFC module 728 as separate blocks, according to various embodiments of the present disclosure, any combination (e.g., two or more) of the cellular module 721, the Wi-Fi module 723, the Bluetooth module 725, the GPS module 727, the NFC module 728, and/or the like may be included in an Integrated Chip (IC) or an IC package. For example, at least some of the processors corresponding to the respective the cellular module 721, the Wi-Fi module 723, the Bluetooth module 725, the GPS module 727, the NFC module 728, and/or the like, may be implemented as a single SoC. For example, a CP corresponding to the cellular module 721 and a Wi-Fi processor corresponding to Wi-Fi module 723 may be implemented as a single SoC.

The RF module 729 may, for example, transmit and receive RF signals. Although not shown, the RF module 729 may include a transceiver, a Power Amp Module (PAM), a frequency filter, a Low Noise Amplifier (LNA), and/or the like. The RF module 734 may include one or more components for transmitting and receiving Electro-Magnetic (EM) waves (e.g., in free space or the like) such as, for example, conductors or conductive wires. Although FIG. 7 illustrates that the cellular module 721, the Wi-Fi module 723, the Bluetooth module 725, the GPS module 727, and the NFC module 728 are sharing one RF module 729, according to various embodiments of the present disclosure, at least one of the cellular module 721, the Wi-Fi module 723, the Bluetooth module 725, the GPS module 727, the NFC module 728, and/or the like may transmit and receive RF signals via a separate RF module.

The SIM card 724 may be a card implementing a SIM, and may be configured to be inserted into a slot disposed at a specified location of the electronic device. The SIM card 724 may include a unique identifier (e.g., Integrated Circuit Card IDentifier (ICCID)) subscriber information (e.g., International Mobile Subscriber Identity (IMSI)), and/or the like.

The memory 730 (e.g., memory 130) may include an internal memory 732, an external memory 734, or a combination thereof.

According to various embodiments of the present disclosure, the internal memory 732 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 732 may be a Solid State Drive (SSD). As an example, the external memory 734 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 734 may be operatively coupled to electronic device 101 via various interfaces. According to various embodiments of the present disclosure, the electronic device 701 may include recording devices (or recording media) such as, for example, Hard Disk Drives (HDD), and/or the like.

The sensor module 740 may measure physical/environmental properties detect operational states associated with electronic device 101, and/or the like, and convert the measured and/or detected information into signals such as, for example, electric signals or electromagnetic signals. As an example, the sensor module 740 may include at least one of a gesture sensor 740A, a gyro sensor 740B, an atmospheric pressure sensor 740C, a magnetic sensor 740D, an accelerometer 740E, a grip sensor 740F, a proximity sensor 740G, an RGB sensor 740H, a biometric sensor 740I, a temperature/humidity sensor 740J, a luminosity sensor 740K, a Ultra Violet (UV) sensor 740M, and/or the like. The sensor module 740 may detect the operation state of the electronic device and/or measure physical properties, and convert the detected or measured information into electrical signals. Additionally or alternatively, the sensor module 740 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 740 may also include control circuitry for controlling one or more sensors included therein.

The input module 750 may include a touch panel 752, a (digital) pen sensor 754, a key 756, an ultrasonic input device 758, and/or the like.

As an example, the touch panel 752 may detect touch input using capacitive, resistive, infrared, ultrasonic methods, and/or the like. The touch panel 752 may also include a touch panel controller (not shown). As an example, a capacitive-type touch panel may detect proximity inputs (e.g. hovering input) in addition to, or as an alternative to, physical touch inputs. The touch panel 752 may also include a tactile layer. According to various embodiments of the present disclosure, the touch panel 752 may provide haptic feedback to the user using the tactile layer.

As an example, the (digital) pen sensor 754 may be implemented using methods identical to or similar to receiving a touch input from a user, or using a separate detection sheet (e.g., a digitizer).

As an example, the key 756 may be a keypad, a touch key, and/or the like.

As an example, the ultrasonic input device 758 may be a device configured to identify data by detecting, using a microphone (e.g., a microphone 788), ultrasonic signals generated by a device capable of generating the ultrasonic signal. The ultrasonic input device 758 may detect data wirelessly.

According to various embodiments of the present disclosure, the electronic device 101 may receive user input from an external device (e.g., a network, computer or server) connected to the electronic device 101 using the communication module 720.

The display module 760 (e.g., display 150) may include a panel 762, a hologram device 764, a projector 766, and/or the like. As an example, the panel 762 may be, for example, a Liquid-Crystal Display (LCD), an Active-Matrix Organic Light-Emitting Diode (AM-OLED) display, and/or the like. As an example, the panel 762 may be configured to be flexible, transparent, and/or wearable. The panel 762 and the touch panel 752 may be implemented as a single module. The hologram device 764 may provide a three-dimensional image. For example, the hologram device 764 may utilize the interference of light waves to provide a three-dimensional image in empty space. The projector 766 may provide image by projecting light on a surface (e.g., a wall, a screen, and/or the like). As an example, the surface may be positioned internal or external to electronic device 101. According to various embodiments of the present disclosure, the display module 760 may also include a control circuitry for controlling the panel 762, the hologram device 764, the projector 766, and/or the like.

The interface 770 may include, for example, one or more interfaces for a High-Definition Multimedia Interface (HDMI) 772, a Universal Serial Bus (USB) 774, a projector 776, or a D-subminiature (D-sub) 778, and/or the like. As an example, the interface 770 may be part of the communication interface 720. Additionally or alternatively, the interface 770 may include, for example, one or more interfaces for Mobile High-definition Link (MHL), Secure Digital (SD)/MultiMedia Card (MMC), Infrared Data Association (IrDA), and/or the like.

The audio module 780 may encode/decode sound into electrical signal, and vice versa. According to various embodiments of the present disclosure, at least a portion of audio module 780 may be part of the I/O interface 140. As an example, the audio module 780 may encode/decode voice information that is input into, or output from, the speaker 782, the receiver 784, the earphone 786, the microphone 788, and/or the like.

The camera module 791 may capture still images and/or video. According to various embodiments of the present disclosure, the camera module 791 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 795 may manage electrical power of the electronic device 101. Although not shown, the power management module 795 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 101 may include wired or wireless charging. The charger IC may charge a battery, may prevent excessive voltage or excessive current from a charger from entering the electronic device 101, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 796, and/or the like.

As an example, the battery 796 may supply power to the electronic device 101. As an example, the battery 796 may be a rechargeable battery, a solar battery, and/or the like.

The indicator 797 may indicate one or more states (e.g., boot status, message status, charge status, and/or the like) of the electronic device 101 or a portion thereof (e.g., the AP 710). Motor 798 may convert an electrical signal into a mechanical vibration.

Although not shown, the electronic device 700 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method for displaying application information on a mobile device, the method comprising:
   executing a foreground application in a foreground and first and second background applications in a background;
   displaying a user interface for the foreground application;
   receiving, on the user interface for the foreground application, a first user input to display a user interface for the first background application executing in the background; and
   in response to receiving the first user input on the user interface for the foreground application, displaying, through a hole in the user interface for the foreground application at a location corresponding to the first user input, a stack of the user interfaces for the background applications at a scale at which the user interfaces for the background applications were most recently displayed while maintaining display of the user interface for the foreground application outside of the hole,
   wherein displaying the stack comprises display of a portion of a user interface for the first background application displayed over a portion of a user interface for the second background application displayed over the user interface for the foreground application, and
   wherein the displayed stack is initially displayed as corresponding to the location and a shape of the hole.

2. The method of claim 1, wherein, if no input is received within a predetermined time, display of the stack is removed.

3. The method of claim 1, further comprising:
   receiving a second user input to restore the user interface for the foreground application; and
   in response to receiving the second user input, removing display of the stack.

4. The method of claim 1, wherein the first background application comprises the background application whose user interface was most recently displayed in the foreground.

5. The method of claim 4, further comprising:
   receiving a second user input selecting a user interface for the second background application to be displayed at the location; and
   displaying the user interface for the second background application through the hole.

6. The method of claim 4, further comprising:
   receiving a second user input;
   displaying the hole on the user interface for the first background application; and
   displaying a user interface for the second background application through the hole.

7. The method of claim 6, further comprising:
displaying at least a border portion of each of the user interfaces for the background applications that are displayed.

8. The method of claim 6, wherein the displayed user interface for the second background application is smaller than the displayed user interface for the first background application.

9. The method of claim 1, further comprising:
receiving a second user input; and
in response to the second user input, changing the displayed portion of the user interface for the first background application.

10. The method of claim 1, wherein the location is determined according to the first user input.

11. The method of claim 1, wherein the location of the hole through which the stack is displayed is determined according to the first user input.

12. The method of claim 1, wherein the location and the shape of the hole are predetermined.

13. The method of claim 1, wherein at least one of a size or the shape of the hole are dynamically resizable.

14. The method of claim 1, further comprising:
receiving a second user input; and
in response to the second user input, changing the location of the hole.

15. The method of claim 14, wherein the displayed portion of the user interface for the first background application is changed according to the changed location of the hole.

16. The method of claim 14, wherein the displayed portion of the user interface for the first background application is maintained when at least one of the location or the shape of the hole is changed.

17. The method of claim 1, further comprising:
receiving a second user input selecting the user interface for the second background application to be displayed.

18. An apparatus for a mobile device, the apparatus comprising:
a display screen configured to display a user interface for a foreground application; and
a controller configured to:
execute a foreground application in a foreground;
execute first and second background applications in a background;
receive, on the user interface for the foreground application, a first user input to display a user interface for the first background application executing in the background, and
in response to receiving the first user input, control the display screen to display, through a hole in the user interface for the foreground application at a location corresponding to the first user input, a stack of the user interfaces for the background applications at a scale at which the user interfaces for the background applications were most recently displayed while maintaining display of the user interface for the foreground application outside of the hole,
wherein, in displaying the stack, the controller is configured to display a portion of a user interface for the first background application displayed over a portion of a user interface for the second background application displayed over the user interface for the foreground application, and
wherein the displayed stack is initially displayed as corresponding to the location and a shape of the hole.

19. The apparatus of claim 18, wherein, if no input is received within a predetermined time, display of the stack is removed.

20. The apparatus of claim 18, wherein the controller is further configured to:
receive a second user input to restore the user interface for the foreground application; and
in response to receiving the second user input, remove display of the stack.

21. The apparatus of claim 18, wherein the first background application comprises the background application whose user interface was most recently displayed in the foreground.

22. The apparatus of claim 21, wherein the controller is further configured to:
receive a second user input selecting a user interface for the second background application to be displayed at the location; and
control the display screen to display the user interface for the second background application through the hole.

23. The apparatus of claim 21, wherein the controller is further configured to:
receive a second user input;
control the display screen to display the hole on the user interface for the first background application; and
control the display screen to display a user interface for the second background application through the hole.

24. The apparatus of claim 23, wherein the controller is further configured to control the display screen to display at least a border portion of each of the user interfaces for the background applications that are displayed.

25. The apparatus of claim 23, wherein the displayed user interface for the second background application is smaller than the displayed user interface for the first background application.

26. The apparatus of claim 18, wherein the controller is further configured to:
receive a second user input; and
in response to the second user input, change the displayed portion of the user interface for the first background application.

27. The apparatus of claim 18, wherein the location is determined according to the first user input.

28. The apparatus of claim 18, wherein a location of the hole through which the stack is displayed is determined according to the first user input.

29. The apparatus of claim 18, wherein the location and the shape of the hole are predetermined.

30. The apparatus of claim 18, wherein at least one of a size or the shape of the hole are dynamically resizable.

31. The apparatus of claim 18, wherein the controller is further configured to:
receive a second user input; and
in response to the second user input, change the location of the hole.

32. The apparatus of claim 31, wherein the controller is further configured to control the display screen to change the displayed portion of the user interface for the first background application according to the changed location of the hole.

33. The apparatus of claim 31, wherein the controller is further configured to control the display screen to maintain the displayed portion of the user interface for the first background application when at least one of the location or the shape of the hole is changed.

34. The apparatus of claim 18, wherein the controller is further configured to:

store an image of a most recently displayed user interface for each background application; and in response to a second user input, (i) exchange the user interface for the first background application displayed in the hole with the user interface for the foreground application and (ii) remove the hole.

35. The method of claim 17, further comprising, in response to the second user input:

exchanging the user interface for the background application with the user interface for the foreground application, and removing the hole.

\* \* \* \* \*